US011489897B2

(12) United States Patent
Kanza et al.

(10) Patent No.: US 11,489,897 B2
(45) Date of Patent: Nov. 1, 2022

(54) METHOD AND APPARATUS FOR ADJUSTING STREAMING MEDIA CONTENT BASED ON CONTEXT

(71) Applicant: AT&T Intellectual Property I, L.P., Atlanta, GA (US)

(72) Inventors: Yaron Kanza, Fairlawn, NJ (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/995,010

(22) Filed: Aug. 17, 2020

(65) Prior Publication Data
US 2022/0053042 A1 Feb. 17, 2022

(51) Int. Cl.
*H04N 21/454* (2011.01)
*H04L 65/612* (2022.01)
*H04N 21/845* (2011.01)
*H04N 21/2343* (2011.01)
*H04N 21/258* (2011.01)

(52) U.S. Cl.
CPC ..... *H04L 65/612* (2022.05); *H04N 21/23439* (2013.01); *H04N 21/25841* (2013.01); *H04N 21/454* (2013.01); *H04N 21/8456* (2013.01)

(58) Field of Classification Search
CPC ....... H04N 21/23439; H04N 21/25841; H04N 21/454; H04N 21/8456; H04N 21/2358; H04L 65/4048; H04L 65/612
See application file for complete search history.

(56) References Cited

U.S. PATENT DOCUMENTS

| 5,195,135 A | 3/1993 | Palmer |
| 5,757,417 A | 5/1998 | Aras |
| 6,216,228 B1 | 4/2001 | Chapman et al. |
| 7,200,852 B1 | 4/2007 | Block |

(Continued)

FOREIGN PATENT DOCUMENTS

KR 20050018656 A 2/2005

OTHER PUBLICATIONS

Alt, Bastian et al., CBA: Contextual Quality Adaptation for Adaptive Bitrate Video Streaming (Extended Version); arXiv:1901.05712v1 [cs.MM] Jan. 17, 2019; pp. 1-15.

(Continued)

*Primary Examiner* — Ryan J Jakovac
(74) *Attorney, Agent, or Firm* — Guntin & Gust, PLC; Matthew Tropper

(57) ABSTRACT

Aspects of the subject disclosure may include, for example, responsive to a viewing request associated with a media content item, for each original content segment of a plurality of content segments of the media content item determining whether content characteristic information associated with the original content segment is compatible with viewing context information associated with the viewing request, and, if not compatible, then replacing the original content segment with an alternative content segment of the plurality of content segments, and streaming the alternative content segment to a user device, and, if compatible, then responsive to determining the content characteristic information is compatible with the viewing context information, streaming the original content segment to the user device. Other embodiments are disclosed.

20 Claims, 7 Drawing Sheets

(56) References Cited

U.S. PATENT DOCUMENTS

| | | |
|---|---|---|
| 7,756,110 B2 | 7/2010 | Factor et al. |
| 8,793,721 B1 | 7/2014 | Sharkey et al. |
| 8,949,878 B2 | 2/2015 | Jasinschi et al. |
| 9,235,917 B2 | 1/2016 | Puri et al. |
| 9,363,556 B1 | 6/2016 | Sharkey et al. |
| 9,781,186 B2 | 10/2017 | Rosenzweig et al. |
| 10,313,744 B2 | 6/2019 | Jarman |
| 10,476,923 B2 | 11/2019 | Tarbox et al. |
| 10,805,656 B1* | 10/2020 | Jackson ............. H04N 21/2541 |
| 2006/0020714 A1 | 1/2006 | Girouard et al. |
| 2007/0297641 A1 | 12/2007 | Criddle et al. |
| 2009/0089827 A1 | 4/2009 | Carlsgaard et al. |
| 2009/0089828 A1 | 4/2009 | Carlsgaard et al. |
| 2010/0174722 A1 | 7/2010 | Carteri |
| 2010/0278231 A1 | 11/2010 | Petersen et al. |
| 2012/0057850 A1 | 3/2012 | Klappert et al. |
| 2012/0079000 A1 | 3/2012 | Calcev et al. |
| 2013/0091249 A1* | 4/2013 | McHugh ............ H04N 21/6332 709/219 |
| 2015/0271554 A1 | 9/2015 | Shetty |
| 2016/0359937 A1 | 12/2016 | Chung et al. |
| 2018/0014077 A1* | 1/2018 | Hou ................. H04N 21/26233 |
| 2018/0359477 A1 | 12/2018 | Yang |
| 2020/0186851 A1 | 6/2020 | Kahn et al. |
| 2020/0382818 A1* | 12/2020 | Lee .................... H04N 21/2668 |
| 2020/0413141 A1* | 12/2020 | Loheide ............... H04N 21/458 |

OTHER PUBLICATIONS

De Freitas, Pedro et al., A Multimodal CNN-based Tool to Censure Inappropriate Video Scenes; arXiv:1911.03974v1 [cs.MM] Nov. 10, 2019; pp. 1-7.

Ruether, Traci, How Artificial Intelligence Is Transforming Live Streaming; (https://www.wowza.com/blog/author/traciruether); Jul. 8, 2019; pp. 1-9.

* cited by examiner

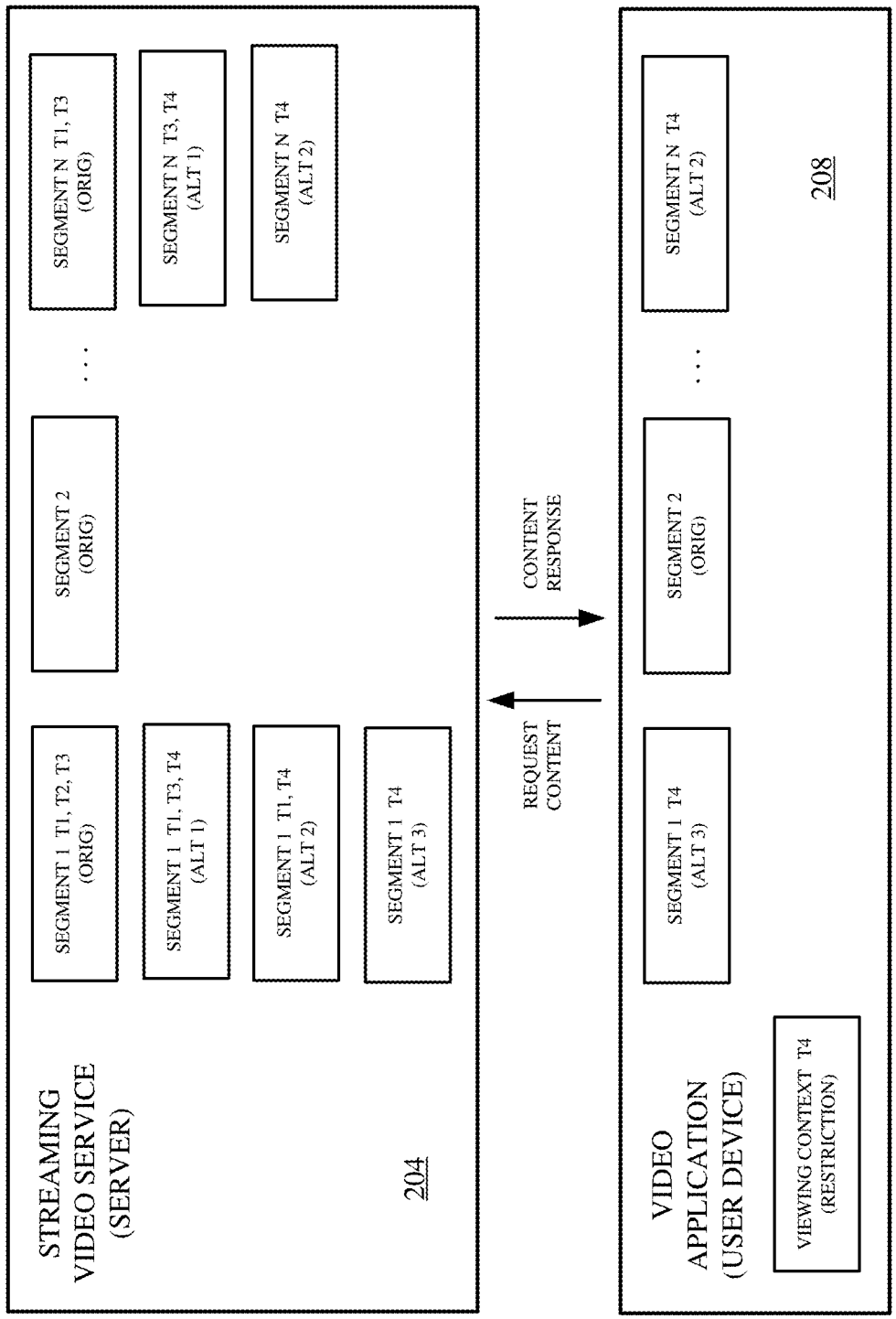

240

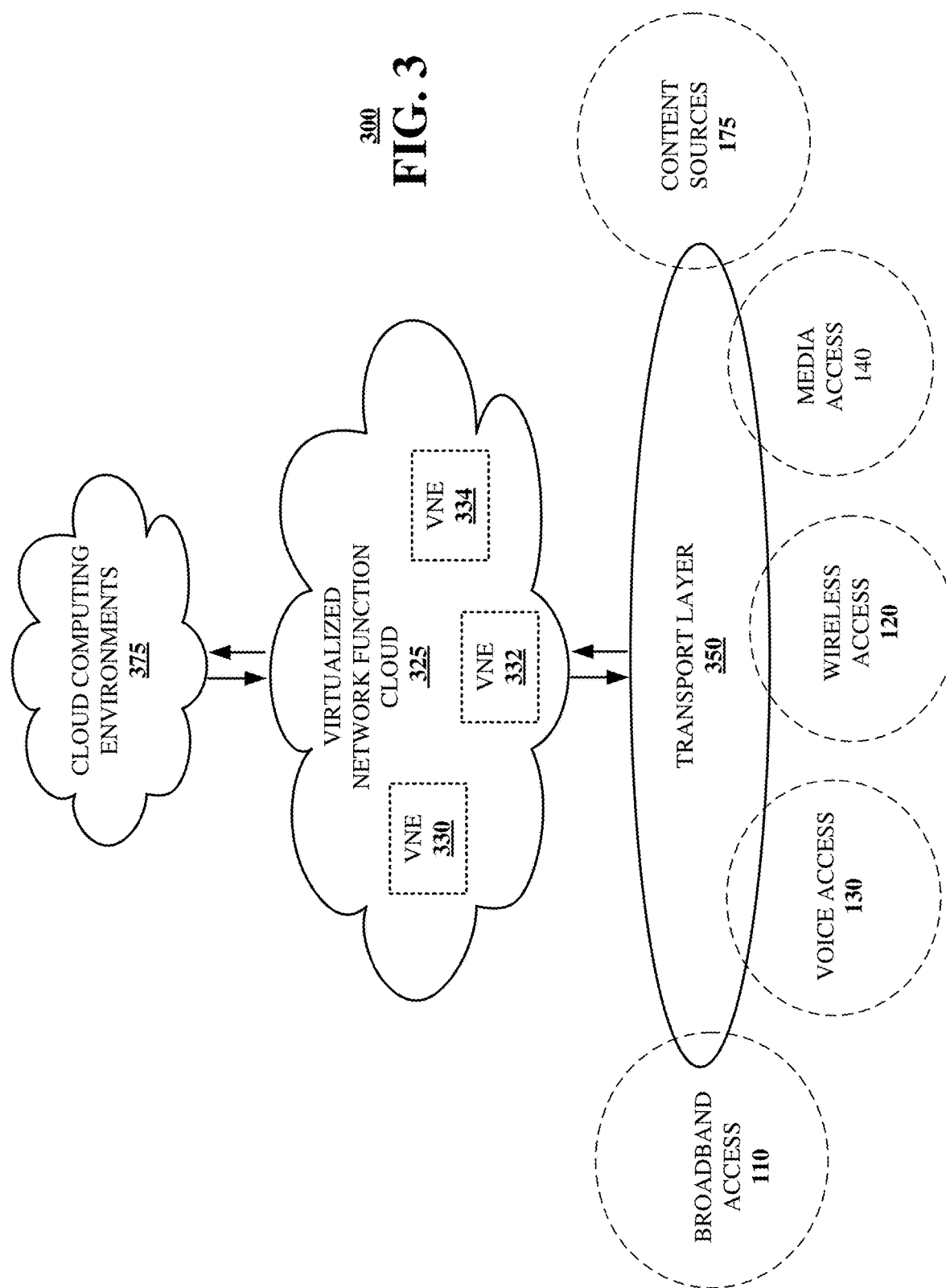

METHOD AND APPARATUS FOR ADJUSTING STREAMING MEDIA CONTENT BASED ON CONTEXT

FIELD OF THE DISCLOSURE

The subject disclosure relates to a method and an apparatus for adjusting streaming media content based on context

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system for of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
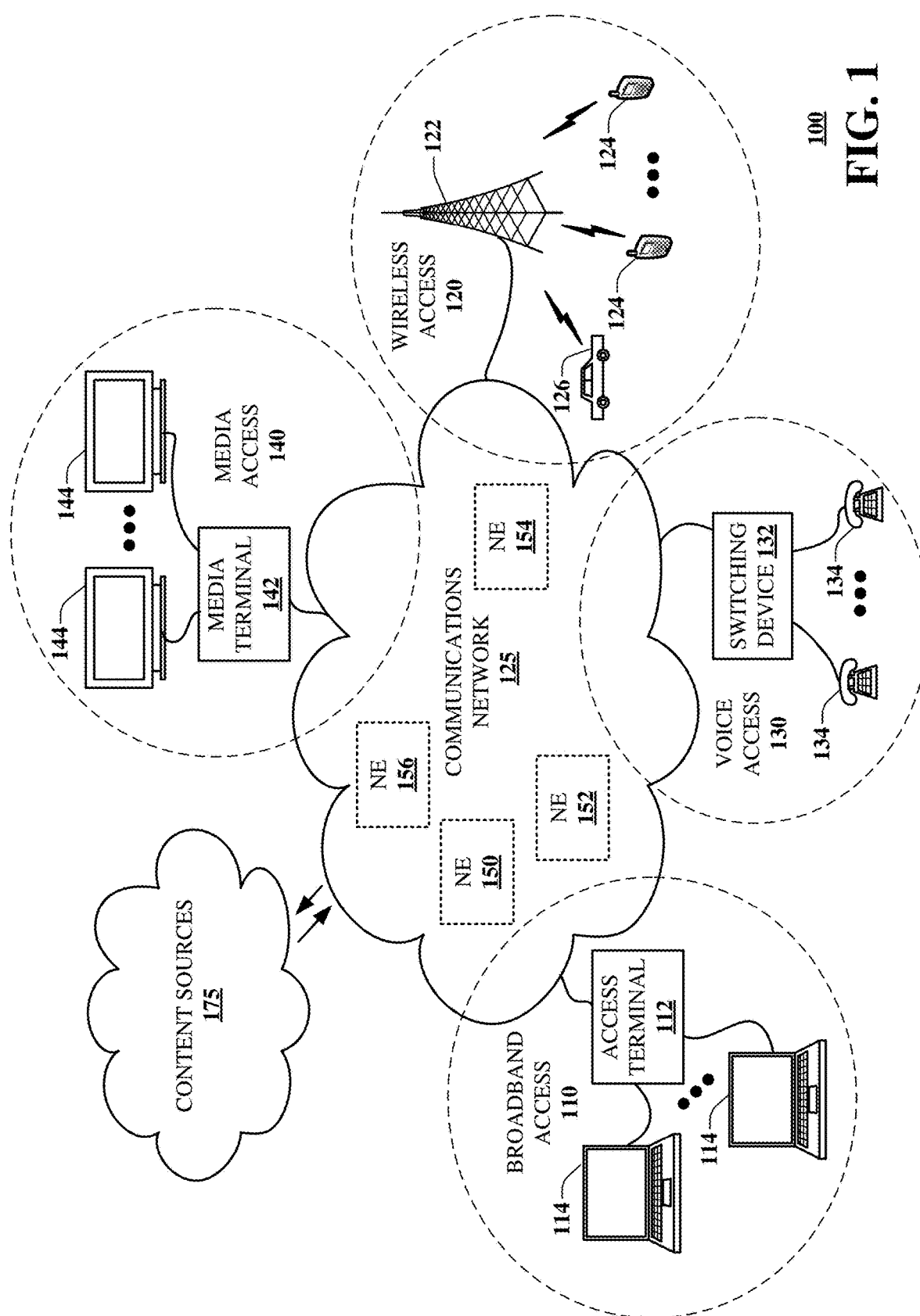
FIG. 1 is a block diagram illustrating an exemplary, non-limiting embodiment of a communications network in accordance with various aspects described herein.

The subject disclosure describes, among other things, illustrative embodiments for adjusting streaming media content based on context. A viewing request for a media content item is received from a user device. The request can include viewing context information. The media content can be partitioned into content segments, which can be original content segments and alternative content segments. Before streaming each segment, content characteristic information for the original content segment is compared to the viewing context information. If the content characteristic information is not compatible with the viewing context information, the original content segment is replaced with an alternative content segment that is compatible. The alternative content segment is then streamed to the user device. If the content characteristic information of the original content segment is compatible with the viewing context information, then the original content segment is streamed to the user device. Other embodiments are described in the subject disclosure.

One or more aspects of the subject disclosure include a method, performing operations by a wavelength converter. The method can include receiving a media content item partitioned into a plurality of content segments comprising original content segments and alternative content segments. The plurality of content segments can include a plurality of content characteristic information associated with the plurality of content segment. The method can also include receiving a viewing request associated with the media content item via a user device, wherein the viewing request includes viewing context information. Responsive to the receiving the viewing request, for each original content segment of the plurality of content segments, the method can further include determining, by the processing system, whether the content characteristic information associated with the original content segment is compatible with the viewing context information associated with the viewing request, and, if not compatible, then replacing the original content segment with an alternative content segment streaming the alternative content segment to the user device. If compatible, then streaming the original content segment to the user device.

One or more aspects of the subject disclosure include a device, including a processing system including a processor and a memory that stores executable instructions that, when executed by the processing system, facilitate performance of operations. The operations can include receiving a viewing request associated with a media content item via a user device, wherein the viewing request includes viewing context information. The media content item can be partitioned into a plurality of content segments including original content segments and alternative content segments. The plurality of content segments can include a plurality of content characteristic information associated with the plurality of content segments. Responsive to the receiving the viewing request, for each original content segment of the plurality of content segments, the operations can also include determining whether the content characteristic information associated with the original content segment is compatible with the viewing context information associated with the viewing request. If not compatible with the viewing context information, then the operations can further include replacing the original content segment with an alternative content segment and streaming the alternative content segment to the user device. If compatible with the view control information, then the operations can perform streaming the original content segment to the user device.

One or more aspects of the subject disclosure include a machine-readable medium, comprising executable instructions that, when executed by a processing system including a processor, facilitate performance of operations. Responsive to a viewing request associated with a media content item, for each original content segment of a plurality of content segments of the media content item, the operations can include determining whether content characteristic information associated with the original content segment is compatible with viewing context information associated with the viewing request. If not compatible with the viewing context information, then the operations can further include replacing the original content segment with an alternative content segment of the plurality of content segments, and, in turn, streaming the alternative content segment to a user device. If compatible with the viewing context information, then streaming the original content segment to the user device.

Referring now to FIG. 1, a block diagram is shown illustrating an example, non-limiting embodiment of a system 100 in accordance with various aspects described herein. For example, system 100 can facilitate in whole or in part adjusting media content based on viewing context. A viewing request for a media content item is received from a user device. The request can include viewing context information. The media content can be partitioned into content segments, which can be original content segments and alternative content segments. Before streaming each segment, content characteristic information for the original content segment is compared to the viewing context information. If the content characteristic information is not compatible with the viewing context information, the original content segment is replaced with an alternative content segment that is compatible. The alternative content segment is then streamed to the user device. If the content characteristic information of the original content segment is compatible with the viewing context information, then the original content segment is streamed to the user device.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200 functioning within the communication network of FIG. 1 in accordance with various aspects described herein. In one or more embodiments, the system 200 can facilitate adjusting media content based on viewing context. The system 200 can include a streaming video service 204 executing at, for example, a server. The system can also include a video application 208 executing at, for example, a user device. In one or more embodiments, the streaming video service 204 can receive media content items. Each media content item can be partitioned into content segments. For example, a media content item can be partitioned into n content segments. The n content segments can be the original media content item directly partitioned into the n original content segments.

In one or more embodiments, the media content item can also include alternative content segments. The alternative content segments can be generated by modifying the original content segments in any way, or in any combination of ways. In one example, an original content segment can be entirely replaced with a new or different alternative content segment. In another example, a portion of the original content segment can be modified to create the alternative content segment. In another example, video or audio of the original content segment can altered, replaced. In another example, the original content segment can simply be eliminated, so that the "alternative content segment" is not a segment at all, but just skipping over the original content segment.

In one or more embodiments, the media content item is not limited to streaming video. The media content item can be streaming audio, such as music or a podcast. The media content item can be streaming 3D content from a virtual reality source or a video game. In addition, various types of streaming video content can be used, such as real-time streaming video, video on demand (VOD), streaming television, webcasting, or catch-up television.

In one or more embodiments, the original content segments include content characteristic information. The content characteristic information indicates types or categories of content are present in an original content segment (ORIG) or an alternative content segment (ALT). The content characteristic information can be in the form of tags attached to the content segment. For example, first original content segment includes content characteristic information tags T1, T2, and T3, which can, for example, indicate the presence of violence (T1), profanity (T2), and sexual content (T3) in this segment. A first alternative content segment (ALT 1) can include violence (T1), sexual content (T3), and smoking (T4) while a fourth alternative segment (ALT 4) can include only smoking (T4). Generally, where an original content segment (ORIG) includes some type of potentially objectionable content, it is useful to have at least one alternative content segment (ALT) that optionally eliminates the objectionable content.

In one or more embodiments, a viewing request for a media content item can be sent from the video application 208 at the user device to the streaming video service 204 at the server. The request can include the selection of the media content item along with viewing context information. The viewing context information can include one or more information tags listing which types of potentially objectionable content are permissible for this user device in its current viewing context. Alternatively, the information tags can list which type of potentially objectionable content is not permissible for this user device in its current viewing context. In another alternative, the viewing context information can list contextual information about the usage, such as location of usage, proximity of usage to another device. In such a case, the contextual information can be mapped to allow certain objectionable content but not other objectionable content.

In one or more embodiments, before the streaming video server 204 streams each content segment, the content characteristic information for the original content segment is compared to the viewing context information provided by the video application 208 at the user device to determine if the content is or is not compatible with the context. If the content characteristic information is not compatible with the viewing context information, then the original content segment is replaced with an alternative content segment that is compatible. For example, where the viewing context information allows only smoking (T4) content, then the first original content segment is not compatible, because it includes violence (T1), profanity (T2), and sexual content (T3). The first and second alternative content segments also include impermissible types of content T1, T3 and T1, respectively, and so are also not appropriate substitutes. However, the third alternative content segment includes only smoking (T4) and thus is a viable replacement for the first original content segment. The third alternative content segment is then selected to replace the first original content segment. The third alternative content segment (ALT3) is streamed to the video application 208 at the user device. However, if the content characteristic information of the original content segment is compatible with the viewing context information, then the original content segment is streamed to the user device. For example, the second original content segment does not include any potentially objectionable content. Therefore, the second original content segments can be streamed to the video application 208.

Streaming video is becoming a prevalent service with many active service providers. It is, therefore, desirable to take advantage of synergies between providing content (e.g., streaming video) and providing networking capabilities. A typical streaming video service receives a request for a video and sends data bytes constituting the video to a client device (e.g., a smartphone of the user). The data bytes can be buffered, and a video player application on a client device can present the video. Typical video services can support several functions, including retrieval of the video from at a given point in time, playing the video at different speeds, or selecting the resolution of the video to prevent delays caused by the network. In addition, the video services can support differences in quality of service (QoS), quality of experience (QoE), or network bandwidth. In all these alternatives, however, the video that is provided is always the same and does not depend on the viewing context at the user device.

In one or more embodiments, the system of 200 can provide a safer use and better user experience to users who consume streaming video content. For example, the medica content can be a movie with a few "sensitive" scenes. Instead of restricting this video altogether, or putting the user at that they may watch content they do not wish to watch (or that is not acceptable for the context of watching), the system 200 can allow a user to watch the video in a safer mode by selectively streaming non-objectionable original content segments while selectively replacing objectionable original content segments with non-objectionable, alternative content segments. For example, a nature movie about predators could be educational and yet contain a few violent scenes that are too graphical for children (e.g., a predator catches a prey). The movie can be streamed to the video application 208 by skipping, blurring, and/or replacing objectionable scenes of animal violence.

In one or more embodiments, media content can be modified in real-time based on the viewing context. For example, a video may contain some violent scenes, as well as include some scenes in which the language is inappropriate for children (the content is classified PG-13). Consider the following three users: (1) an adult who would like to see the video as is; (2) an adult who does not like watching violent scenes; and (3) a ten-year-old child, whose parents allow them to watch the violent scenes but do not want them to experience inappropriate language. In such a case, the system 200 can enable adaptation of the media content, during the streaming phase, so that each viewer experiences the media content in a way that appropriately reflects their viewing restrictions, contexts, and/or preferences.

In one or more embodiments, the media content is partitioned into a sequence of small HTTP-based file content segments. Each content segment can include a short interval of playback time of the media content. These content segment files can be sent from the video service 204 server to the client video application 208 at the user device. To achieve real-time adaptation of the content based on the context and the user preferences, the system 200 exploits the partition into segments using any of several methods (or combinations of methods). In one example, the media content can be partitioned into content segments and each content segment can have at least two options—the original content segment or an alternative content segment. For example, the original content segment can present a scene with inappropriate language, while the alternative content segment can present the same scene without the inappropriate language. Content segments include sensitive or restricted content can be described as sensitive segments. Both original content segments and alternative content segments can include sensitive content. However, an alternative content segment can skip, replace, or modify an original content segment to eliminate a particular type of sensitive content.

In one or more embodiments, a content segment can be labeled tags, which provide content characteristic information regarding the sensitive content that is included in the content segment. For example, the tags can provide notice of violence, language, nudity, political content, offensive content, substance abuse, potentially seizure-triggering content (to protect those with epilepsy), dangerous stunts, real accidents or disasters, etc., Each tag, or label, can indicate the existence of sensitive content that viewers may prefer not to be exposed to. In one or more embodiments, each view request from the video application 208 can include viewing context information, which can be in the form of tags. The viewing context information can be based on different contextual parameters, such as user age (e.g., age information obtained from account information), user preferences, the viewing environment (e.g., the device is located at a school or in an airplane), the device setting (e.g., the device is being used by a K-12 student at their school), etc., The context information tags can also specify content that should not be delivered in this streaming session (inappropriate content).

In one or more embodiments, when a video application 208 at a user device sends a streaming request to the streaming video service at the server, the request can include tags (T1, T2, T4). The streaming server 204 can use the context tag information to avoid sending certain inappropriate material to this video application. In one example, the streaming server 204 can determine if there is an alternative content segment for the original content segment, where the alternative content segment does not include the inappropriate material described in tags. The alternative content segment can then be sent to the user application. In another example, the streaming video server 204 can make the image or the sound blurry in the original content segment and, thereby create an "on-the-fly" alternative segment, which is streamed to the video application 208. In another example, the streaming video server may not have or be able to generate an appropriate alternative content segment. In this case, the streaming server 204 can simply skip over the inappropriate content segment and proceed to stream the next available segment.

In one or more embodiments include usage examples, the streaming server 204 can perform an adaptation of the content segments according to the age of a view of the user device. By real-time adaptation of the streaming video, media content can be adapted to age restrictions to improve viewing safety for children. The streaming server 204 can adapt the media content segments based on user preferences. For example, a user of a user device can set preferences to reduce the risk that they would be exposed to content they do not wish to see. In one or more embodiments, the media content item could include multiple alternative content segments for some of the content segments. A multiplicity of segments can allow users with a variety of viewing contexts and restrictions to receive particular alternative content segments based on their preferences, contexts, etc., In one example, a media content item can include several possible endings to a video. A user, who prefers happy endings, could see the video with an alternative ending that this a happy ending. A different user, who prefers thought-provoking endings, could see the video with a thought-provoking ending, and so on. In this case, the viewing context would operate to positively identify a desired content to experience, as opposed to negatively identifying a content to avoid. Note that this could be done automatically based on the user preferences and could be achieved with different alternative content segments.

In one or more embodiments, the streaming video server 204 can perform a location-based content adaptation. In this embodiment, the viewing context information can include location information for the user device. Location acquisition can be performed using any of several methods, including access to a global position system signal (GPS/GNSS), proximity to a network access point like a WiFi transmitter, or proximity to a cellular antenna. In one example, the user device can be connected to a communication network, such as a cellular network or a local area network (LAN). The network connection could be used to indicate an approximate location of the user device that is executing the video application 208. The streaming video service 204 can use this location information to adapt the media content accordingly. For example, the video streaming service 204 can determine from the location information shared by the video application 208 that the user device is currently in a public space, such as a school, a government office, a work place, a hospital, or so forth. Certain content may be inappropriate in these settings. The streaming video service 204 knows if a such sensitive content is present on original or alternative content segments and can purposefully avoid streaming these types of content segments. If such inappropriate content cannot be "selected away from,"—if no alternative content segments eliminate the issue—then the streaming video service 204 can use skipping of content segments or modification of video (blurring) or audio (muting) to avoid the issue.

In one or more embodiments, the streaming video service 204 can adapt the streaming content based on an account or subscription associated with the user device. The user device or the video application 208 can be associated with an account or subscription that is not compatible with certain types of content. For example, the video application or user device may be associated with an account that is provided by a school for K-12 students or an account associated with a particular group of people, who could be compromised by inappropriate content. The account information can give away the setting, where the video application is being used, such as a K-12 school. The account information could indicate that the person likely viewing the video application is a person diagnosed with epilepsy, such that inappropriate content could cause a seizure.

In one or more embodiments, the streaming video service 204 can adapt the streaming content based on restrictions of nearby devices. For example, the user device could be in near proximity to another device. In one example, the proximity can be determined by accessing location information for both devices and determining if the locations are close. In another example, the user device can be sufficiently close the second device to enable direct wireless communications between the devices. In another example, the user device and the second device can share a LAN connection, which would indicate their co-presence in an area covered by the LAN. In one embodiment, the mere presence of a second device proximate to the user device can be enough for the streaming video service 204 to limit sensitive content at the content segments. In one embodiment, the streaming video service 204 further identify content restrictions for the second device and apply these restrictions to the user device anytime the two devices are found to be in near proximity. For example, the streaming video service 204 can access account or subscription data to determine that the second device is likely to be possessed by an underage person. Anytime the streaming video service 204 detects the co-presence of user device with the second device, the service 204 can automatically limit the media content of segments as if the segments are being viewed by the underaged person. In such a case, the restrictions of second device might be applied to video segments streamed to the user device, unless clearly specified otherwise by the user. For example, if the second device is a device used with restrictions for children (e.g., no use of inappropriate language, no adult content, etc.,), then sensitive or inappropriate content aimed for the user device can be modified or may require an explicit permission before being streamed to device the user device while second device is in the area.

In one or more embodiments, labels, or tags, are added to the content data for the original content segments and the alternative content segments of a streaming video. In one embodiment, this labeling can be added by the content creator. In this approach the creator of the content is responsible for providing labels corresponding with the sensitive content on the content segments. In one embodiment, the label information can be added using a third party, such as crowd sourcing. For example, human users of the content segments can add label information based on their analysis of the content and determination that the content satisfies the conditions specified by the label (e.g., tag a segment as violent if there is sufficient violence in this segment). In one embodiment, the labeling can be performed using a machine-learning method. For example, some content could be detected by machine learning tools, such as a neural network that is trained to classify text, audio, or video that is inappropriate for children and to label segments accordingly. Labeling can be performed via any of these methods or by a combination of these approaches.

In one or more embodiments, alternative content segments can be generated and provided to the streaming video service 204. For example, the original creator of the video can provide content with alternative content segments. The video creator can create videos that are intended for streaming apps by providing labeled content in such a way that people with different preferences or restrictions can consume the content the way they prefer it. In another example, third parties can provide alternative content by modifying the original content. For example, a user with appropriate software may blur sensitive scenes, label these scenes, and add them as alternative content segments. In another example, a third party user, who is not the video creator, can add humorous comments to particular scenes—some people may prefer to watch the video with the added comments, while others may prefer not to see them. Users who are not the video creator may create alternative scenes for different video fragments, for a variety of reasons mentioned above.

In one or more embodiments, providing alternative content for video scenes can provide new business opportunities. For example, there could be a demand for alternative content by viewers or by creators of original content, who would like to reach out to a larger audience. A marketplace of alternative content could arrange the payment for alternative-content creators or support trade with alternative content. In another example, tracking of the selection of video content based on preferences could be used by advertisers to match proper advertisements to content. For example, if restrictions are applied to the content segments, then information associated with these restrictions could likewise be applied to advertisements provided to this user. Similarly, where users have preferences, the advertisements could be selected based on these preferences.

Figure 2B:
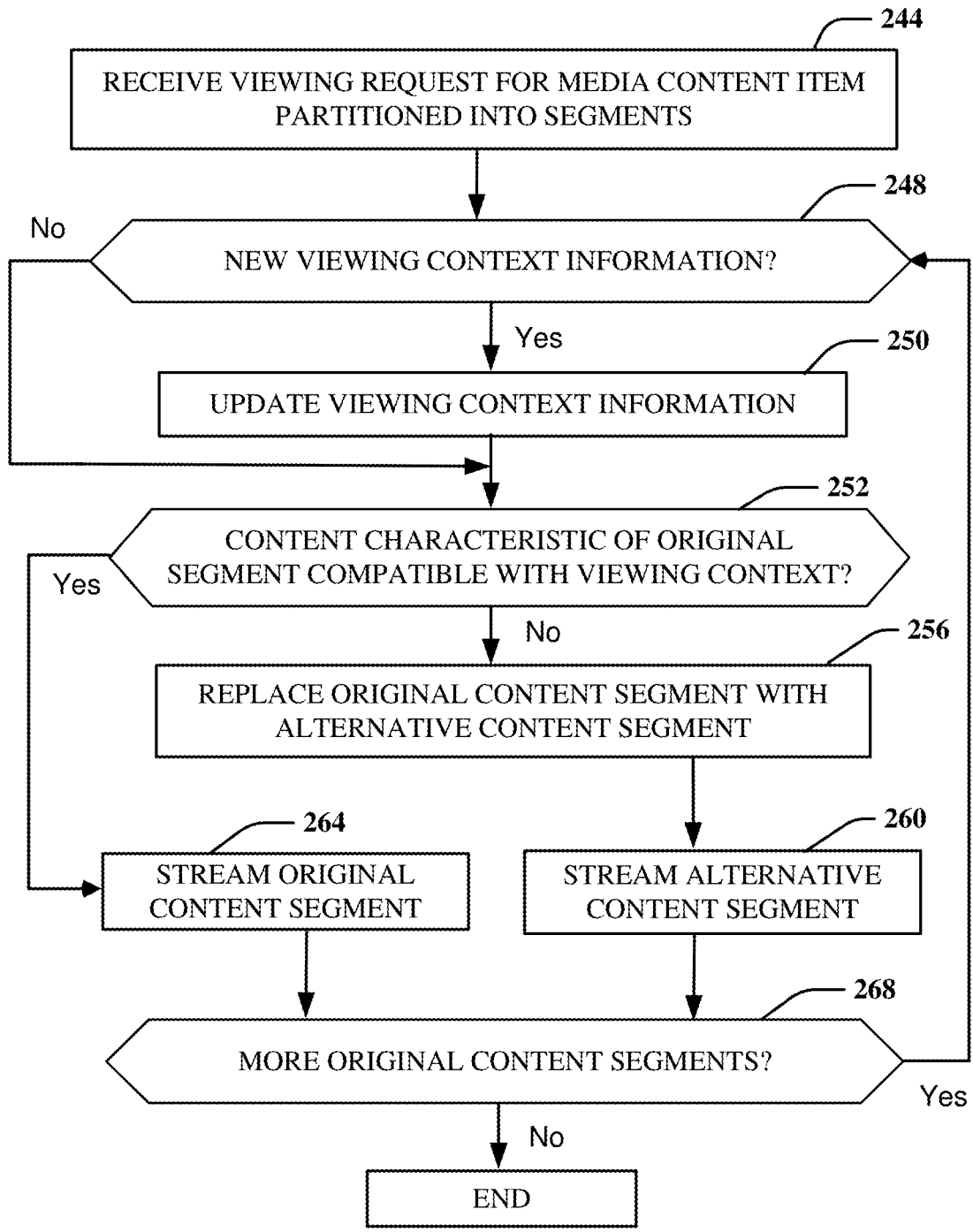
FIG. 2B depicts an illustrative embodiment of a method in accordance with various aspects described herein.

FIG. 2B depicts an illustrative embodiment of a method 240 in accordance with various aspects described herein. While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. At step 244, a request can be received for a media content item. The media content item can be partitioned into segments. The content segments can include content characterization information of the segments. The request can include viewing context information associated with the viewing device of the user. At step 248, the viewing context information can be analyzed to determining if the content information has changed. If so, then, at step 250, the viewing context information can be updated.

At step 252, content characteristic information for an original content segment can be compared to the viewing context information to determine if the content segment is compatible with the viewing context information. If the content characteristic information is not compatible with the viewing context information, at step 256, the original content segment can be replaced with an alternative content segment that is compatible. At step 260, the alternative content segment can then be streamed to the user device. If the content characteristic information of the original content segment is compatible with the viewing context information, at 252, then the original content segment is streamed to the user device at step 264. The process for adjusting the content of the segments is repeated until there are no more original content segments, at step 268. The viewing context information can be checked prior to each content segment to determine if the context has changed and, if so, to update the context so that the content can be adjusted to the new context. The viewing context may change while the media is being streamed. In one example, the location of the user could change. The user may be watching streaming content while walking. Then, the user may enter a school or some other public area while the video continues to play. This location change can result in a change in viewing context. Therefore, the video content can be adapted in response to this change in surrounding environment.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, and 3. For example, virtualized communication network 300 can facilitate in whole or in part adjusting media content based on viewing context. A viewing request for a media content item is received from a user device. The request can include viewing context information. The media content can be partitioned into content segments, which can be original content segments and alternative content segments. Before streaming each segment, content characteristic information for the original content segment is compared to the viewing context information. If the content characteristic information is not compatible with the viewing context information, the original content segment is replaced with an alternative content segment that is compatible. The alternative content segment is then streamed to the user device. If the content characteristic information of the original content segment is compatible with the viewing context information, then the original content segment is streamed to the user device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic, so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
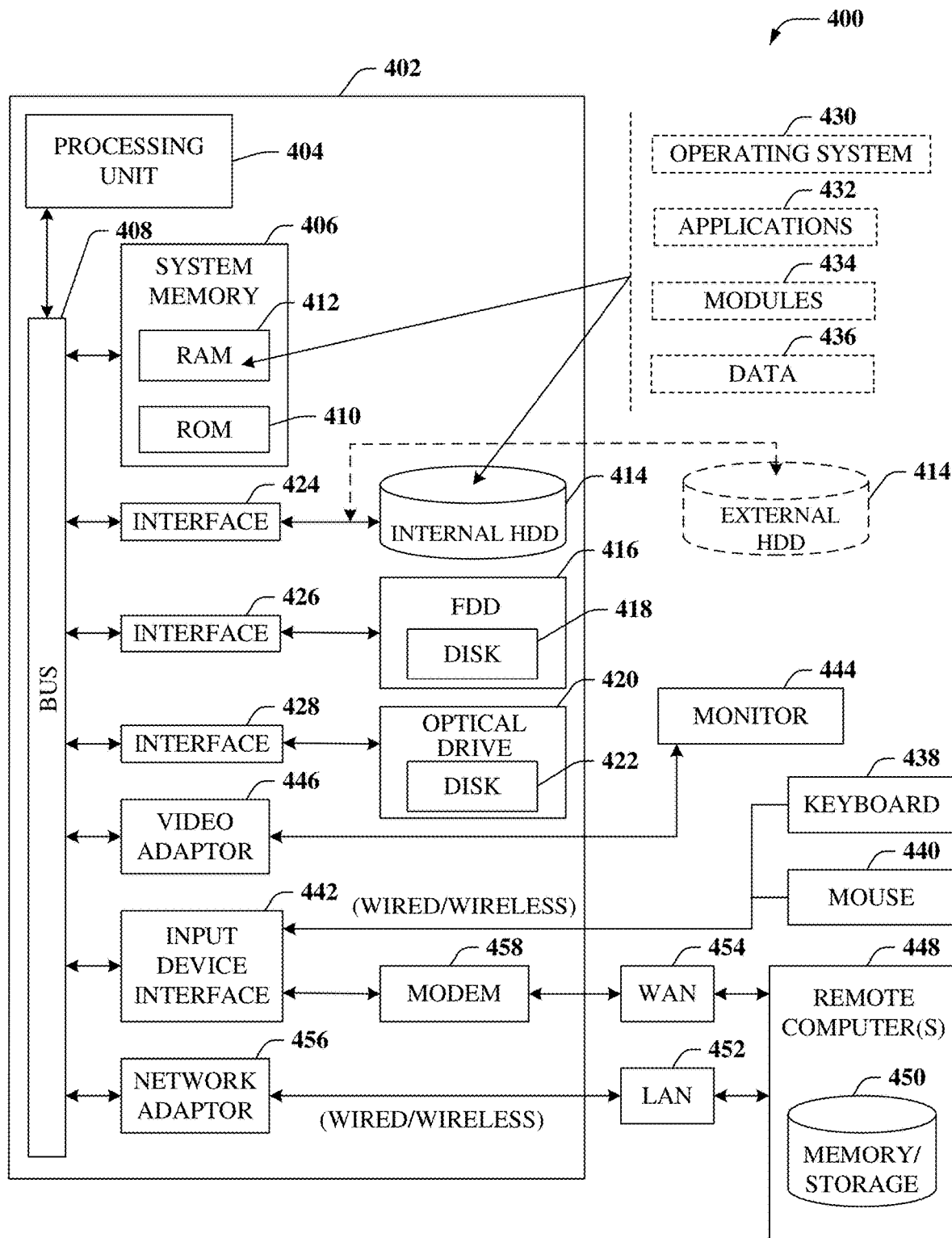
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part adjusting media content based on viewing context. A viewing request for a media content item is received from a user device. The request can include viewing context information. The media content can be partitioned into content segments, which can be original content segments and alternative content segments. Before streaming each segment, content characteristic information for the original content segment is compared to the viewing context information. If the content characteristic information is not compatible with the viewing context information, the original content segment is replaced with an alternative content segment that is compatible. The alternative content segment is then streamed to the user device. If the content characteristic information of the original content segment is compatible with the viewing context information, then the original content segment is streamed to the user device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices. Other examples of computing systems include wearable device, such as smart glasses, personal monitoring devices, and virtual reality goggles.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a wearable device, such as smart glasses, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out, anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
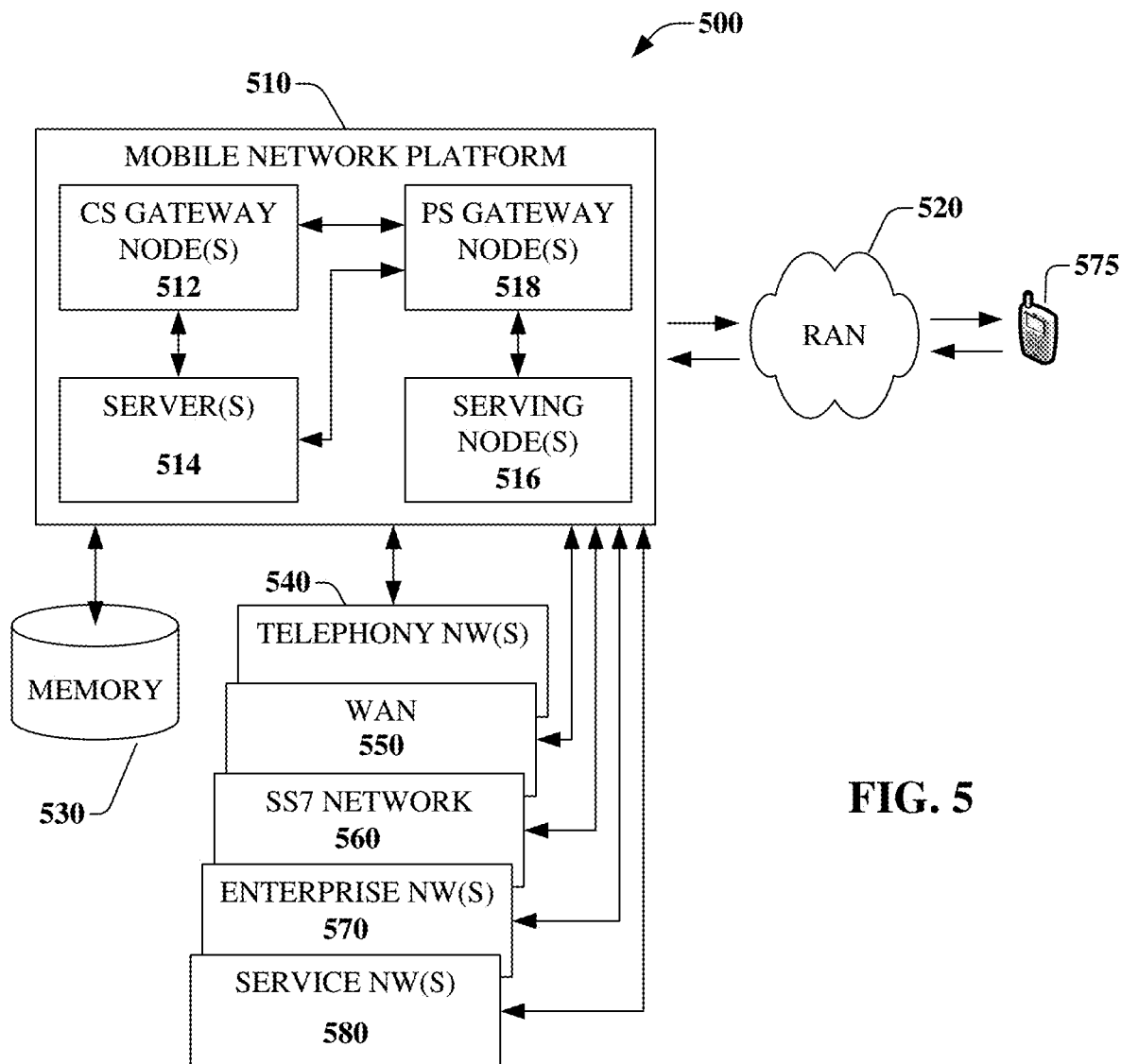
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part adjusting media content based on viewing context. A viewing request for a media content item is received from a user device. The request can include viewing context information. The media content can be partitioned into content segments, which can be original content segments and alternative content segments. Before streaming each segment, content characteristic information for the original content segment is compared to the viewing context information. If the content characteristic information is not compatible with the viewing context information, the original content segment is replaced with an alternative content segment that is compatible. The alternative content segment is then streamed to the user device. If the content characteristic information of the original content segment is compatible with the viewing context information, then the original content segment is streamed to the user device.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
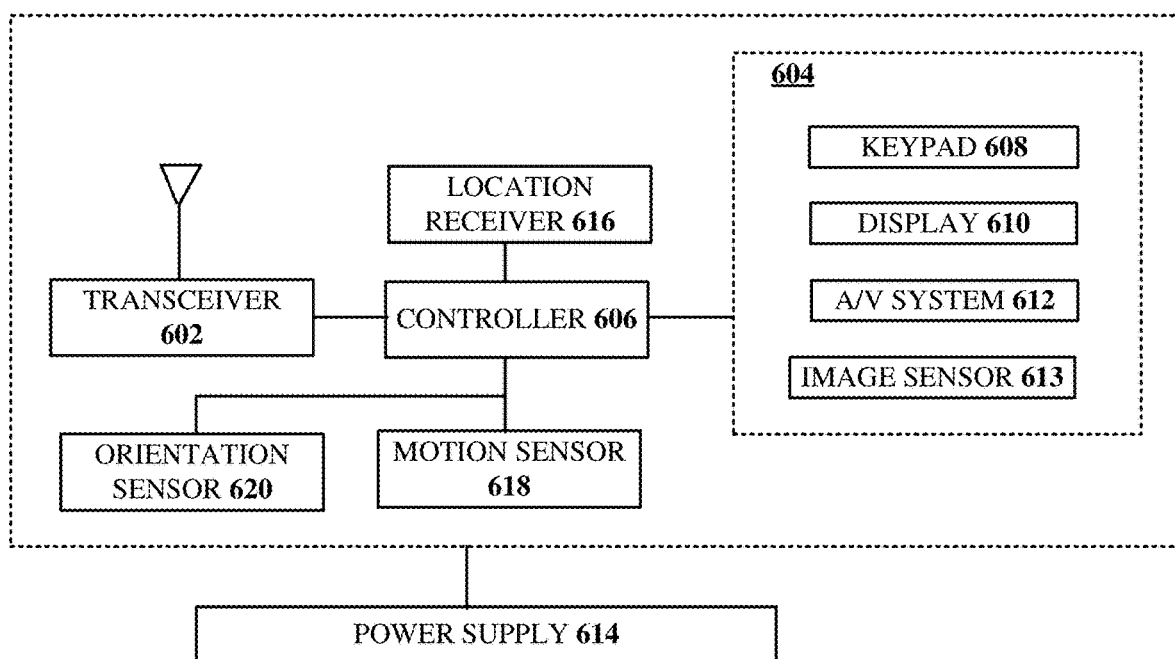
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part adjusting media content based on viewing context. A viewing request for a media content item is received from a user device. The request can include viewing context information. The media content can be partitioned into content segments, which can be original content segments and alternative content segments. Before streaming each segment, content characteristic information for the original content segment is compared to the viewing context information. If the content characteristic information is not compatible with the viewing context information, the original content segment is replaced with an alternative content segment that is compatible. The alternative content segment is then streamed to the user device. If the content characteristic information of the original content segment is compatible with the viewing context information, then the original content segment is streamed to the user device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   obtaining, by a processing system including a processor, a media content item partitioned into a plurality of content segments comprising original content segments and alternative content segments, wherein the plurality of content segments includes a plurality of content characteristic information associated with the plurality of content segments, wherein the plurality of content characteristic information indicates categories of content within the plurality of content segments;
   receiving, by the processing system, a viewing request associated with the media content item via a first user device;
   determining, by the processing system, that a second user device is within a range of the first user device;
   obtaining, by the processing system, content restriction information for the second user device, the content restriction information indicating which categories of content are permissible to be viewed on the second user device;
   responsive to the receiving the viewing request, for at least one original content segment of the plurality of content segments:
      determining, by the processing system, whether the content characteristic information associated with the original content segment is compatible with the content restriction information for the second user device;
      responsive to determining the content characteristic information is not compatible with the content restriction information for the second user device;
      replacing, by the processing system, the original content segment with an alternative content segment; and
      streaming, by the processing system, the alternative content segment to the first user device.

2. The method of claim 1, wherein the determining that a second user device is within a range of the first user device comprises determining that the first user device and the second user device share a local area network connection.

3. The method of claim 1, wherein the determining that a second user device is within a range of the first user device comprises determining comparing a first location information associated with the first user device and a second location information associated with the second user device.

4. The method of claim 1, wherein the obtaining content restriction information for the second user device comprises obtaining subscription data for a user of the second user device.

5. The method of claim 1, further comprising determining, by the processing system, a location of the first user device according to first location information associated with the first user device, wherein the location is not compatible with the content restriction information for the second user device.

6. The method of claim 1, wherein the plurality of content characteristic information comprise a plurality of content tags associated with the plurality of content segments, the plurality of content tags indicating a presence of one or more of violent content, profanity, and sexual content in the plurality of content segments.

7. The method of claim 1, wherein the content restriction information for the second user device is based on a user preference associated with the second user device.

8. The method of claim 1, wherein the content restriction information for the second user device is based on an account associated with the second user device.

9. The method of claim 1, further comprising identifying, by the processing system, the alternative content segment that is compatible with the content restriction information for the second user device.

10. The method of claim 1, wherein the replacing the original content segment further comprises modifying, by the processing system, a portion of audio or video associated with the original content segment to generate the alternative content segment that is compatible with the viewing request.

11. The method of claim 1, skipping the original content segment to generate the alternative content segment that is compatible with the viewing request.

12. The method of claim 1, further comprising:
    receiving, by the processing system, from the first user device, first content characteristic information associated with a first media content item; and
    storing, by the processing system, the first content characteristic information.

13. The method of claim 1, further comprising determining, by the processing system, first content characteristic information associated with a first media content item; and
    storing, by the processing system, the first content characteristic information.

14. A device, comprising
    a processing system including a processor; and
    a memory that stores executable instructions that, when executed by the processing system, facilitate performance of operations, the operations comprising:
    receiving a viewing request associated with a media content item via a first user device, wherein the media content item is partitioned into a plurality of content segments comprising original content segments and alternative content segments, and wherein the plurality of content segments include a plurality of content characteristic information associated with the plurality of content segments, wherein the plurality of content characteristic information indicates categories of content within the plurality of content segments;
    determining that a second user device is within a range of the first user device;
    obtaining content restriction information for the second user device, the content restriction information indicating which categories of content are permissible to be viewed on the second user device;
    responsive to the receiving the viewing request, for at least one original content segment of the plurality of content segments:
       determining whether the content characteristic information associated with the original content segment is compatible with the content restriction information for the second user device;

responsive to determining the content characteristic information is not compatible with the content restriction information for the second user device:
    replacing the original content segment with an alternative content segment; and
    streaming the alternative content segment to the first user device.

15. The device of claim 14, wherein the determining that a second user device is within a range of the first user device comprises determining that the first user device and the second user device share a local area network connection.

16. The device of claim 14, wherein the operations further comprise further determining a location of the first user device according to first location information associated with the first user device, wherein the location is not compatible with the content restriction information for the second user device.

17. The device of claim 14, wherein the plurality of content characteristic information comprise a plurality of content tags associated with the plurality of content segments.

18. The device of claim 14, wherein the operations further comprise identifying the alternative content segment that is compatible with the content restriction information for the second user device, and wherein the content restriction information for the second user device is based on an account associated with the second user device.

19. A non-transitory, machine-readable medium, comprising executable instructions that, when executed by a processing system including a processor, facilitate performance of operations, the operations comprising:

receiving, by the processing system, a viewing request associated with a media content item via a first user device;
determining that a second user device is within a range of the first user device;
obtaining content restriction information for the second user device, the content restriction information indicating which categories of content are permissible to be viewed on the second user device;
responsive to the receiving the viewing request associated with the media content item, for at least one original content segment of a plurality of content segments of the media content item:
    determining whether content characteristic information associated with the original content segment is compatible with the content restriction information for the second user device; and
    responsive to determining the content characteristic information is not compatible with the content restriction information for the second user device:
        replacing the original content segment with an alternative content segment; and
streaming the alternative content segment to the first user device.

20. The non-transitory, machine-readable medium of claim 19, wherein the operations further comprise streaming the original content segment to the first user device responsive to determining the content characteristic information is compatible with the content restriction information for the second user device.

* * * * *